Sept. 15, 1953
R. R. ALEXANDER
2,652,077
FEEDING MECHANISM FOR CHIPPERS
Filed Nov. 22, 1950
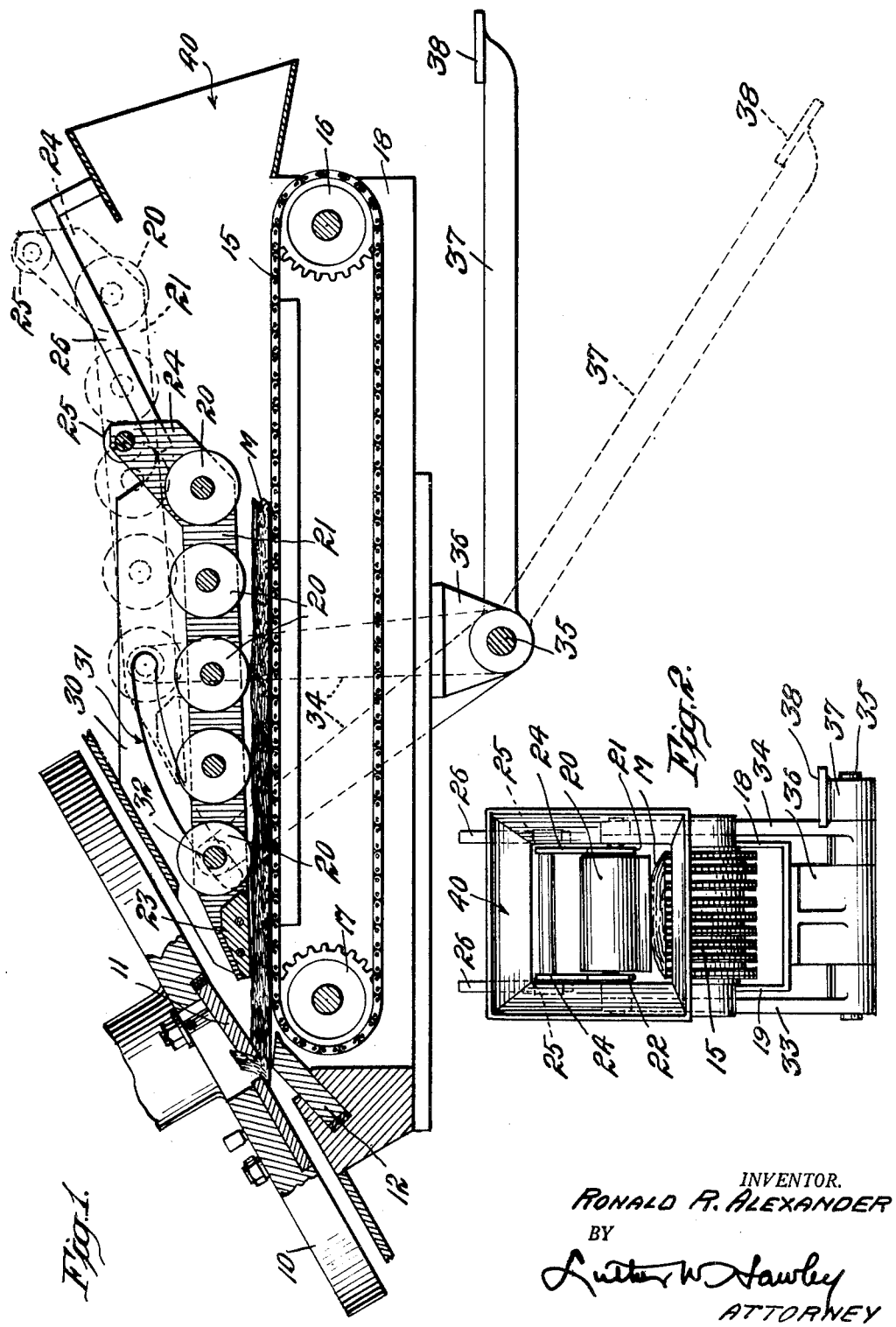
INVENTOR.
RONALD R. ALEXANDER
BY
Luther W. Hawley
ATTORNEY Patented Sept. 15, 1953

2,652,077

UNITED STATES PATENT OFFICE 2,652,077

FEEDING MECHANISM FOR CHIPPERS

Ronald R. Alexander, Carthage, N. Y., assignor to Carthage Machine Company, Carthage, N. Y., a corporation of New York Application November 22, 1950, Serial No. 197,018

3 Claims. (Cl. 144—176)

This invention relates to wood chippers and more particularly to feeding mechanism for chippers.

The invention has for its salient object to provide feeding mechanism for chippers so constructed and arranged that material of varying length and shape can be fed to the chipper at a definite rate of speed.

Another object of the invention is to provide feeding mechanism so constructed and arranged that the material being fed will be gripped or held during the feeding operation.

Further objects of the invention will appear from the following specification taken in connection with the drawings which form a part of this application, and in which Fig. 1 is a longitudinal sectional elevation through the feeding mechanism and showing the chipper disk partly broken away and partly in section; and Fig. 2 is an end elevation of the feeding mechanism shown in Fig. 1.

In the particular embodiment of the invention illustrated in the drawings, there is shown a chipper disk 10 which is mounted to rotate at an angle to the horizontal and has chipper knives 11 mounted thereon in the usual manner and adapted to coact with a stationary knife 12.

The feeding mechanism comprises an endless conveyor 15 mounted at one end on an idler sprocket 16 and at its other end on a sprocket 17 which is driven by any suitable driving connections and the rate of speed of the conveyor 15 is synchronized with the rate of rotation of the chipper disk so that the material M fed by the conveyor will be fed at the desired rate of speed. The conveyor 15 and sprockets 16 and 17 are mounted in side frame members 18 and 19.

In order to effectively feed logs, slabs, or other fragments, such as thin slivers, saw mill waste, etc., or to feed material of varying size and shape, means is provided for pressing the material against the feed conveyor during the feeding movement. This means consists of a plurality of rollers 20 which are mounted for free rotation in a pair of side bars 21 and 22, the bars having secured therebetween at the forward ends thereof, a block 23. The rear ends of the bars extend upwardly at an angle, as shown at 24, and at their upper ends have mounted thereon rollers 25 which rest on inclined guide bars 26.

The side bars 21 and 22 are mounted between side frame members 30 and these members have formed therein arcuate slots 31 which receive the outer ends of a cross rod 32 which extends through the bars 21 and 22. The rod 32 is carried at the upper end of a pair of arms 33 and 34 mounted on a shaft 35 carried by brackets 36. This shaft also has secured thereto a lever arm or pedal 37 having a footrest 38 at the outer end thereof. The material is fed into the feeding mechanism through a funnel or mouth 40 and when it is fed in the pedal is depressed to the dotted line position shown in Fig. 1, thereby forcing the rollers 20 and bars 21 and 22 to the dotted line position in which rollers 25 will be positioned on the upper ends of the inclined bars 26. After the material has been positioned on the conveyor in this manner, the pedal will be released and the rollers and block 23 will move downwardly and will rest on the top of the material being fed. As the material is fed, the friction set up on the rollers and on the block will tend to draw the carriage forwardly, thereby exerting a firm downward pressure and compressing and holding the material as it is fed to the chipper. The material is thus firmly held in position and is fed at a predetermined rate of speed and cannot be pushed rearwardly or backwardly during the feeding operation.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. Feeding mechanism for feeding material to chipper disks, comprising a conveyor and means disposed above and extending longitudinally of the conveyor for pressing the material downwardly on the conveyor, said means including a frame translatably disposed above the conveyor, rollers mounted on the frame, and downwardly and forwardly inclined means for slidably supporting the front and rear ends of said frame, said last named means including a guideway inclined downwardly toward and longitudinally of the path of movement of the conveyor and at an acute angle thereto, said frame being gravitationally movable bodily longitudinally and vertically on said supporting means.

2. Feeding mechanism for feeding material to chipper disks, comprising a conveyor and means disposed above and extending longitudinally of the conveyor for pressing the material downwardly on the conveyor, said means including a frame translatably disposed above the conveyor and having transverse members adapted to rest on the material being fed by the conveyor, downwardly and forwardly inclined supporting and guiding means arranged at an acute angle to the conveyor for engaging the rear end portion of the frame, and means arranged at an acute angle to the conveyor engaging the advance end of the frame for gravitationally guiding the frame downwardly and forwardly of the path of movement of the conveyor, and means for lifting and moving the frame upwardly and rearwardly relative to the conveyor.

3. Feeding mechanism for feeding material to chipper disks, comprising a conveyor and means disposed above and extending longitudinally of the conveyor for pressing the material downwardly on the conveyor, said means including a frame translatably disposed above the conveyor and having transverse rollers adapted to rest on the material being fed by the conveyor, means engaging the advance end of the frame for supporting and guiding the frame downwardly and forwardly of the path of movement of the conveyor and including the provision of an arcuate slot in the frame at an acute angle to the conveyor and a shaft on the frame extending into said slot, means for lifting and moving the frame upwardly and rearwardly, and means for supporting and elevating the rear end of the frame as it moves upwardly and rearwardly including a rail inclined at an acute angle to the conveyor and a roller on the rear end of the frame riding on said rail, the frame being gravitationally lowered to work-engaging position.

RONALD R. ALEXANDER.

References Cited in the file of this patent

UNITED STATES PATENTS

| Number | Name | Date |
|---|---|---|
| 780,921 | Trout | Jan. 24, 1905 |
| 877,878 | Anderson | Jan. 28, 1908 |
| 1,700,400 | Carlson et al. | Jan. 29, 1929 |
| 1,805,906 | Dennis | May 19, 1931 |
| 2,269,352 | Bacon | Jan. 6, 1942 |

FOREIGN PATENTS

| Number | Country | Date |
|---|---|---|
| 101,625 | Sweden | May 20, 1941 |